(12) United States Patent
Shimazawa et al.

(10) Patent No.: US 7,974,043 B2
(45) Date of Patent: Jul. 5, 2011

(54) THERMALLY ASSISTED MAGNETIC HEAD

(75) Inventors: Koji Shimazawa, Tokyo (JP); Kosuke Tanaka, Tokyo (JP); Takaaki Domon, Tokyo (JP)

(73) Assignee: TDK Corporation, Tokyo (JP)

( * ) Notice: Subject to any disclaimer, the term of this patent is extended or adjusted under 35 U.S.C. 154(b) by 978 days.

(21) Appl. No.: 11/896,059

(22) Filed: Aug. 29, 2007

(65) Prior Publication Data
US 2008/0055784 A1    Mar. 6, 2008

(30) Foreign Application Priority Data

Aug. 31, 2006  (JP) ................................ P2006-236290

(51) Int. Cl.
*G11B 11/105*    (2006.01)
*G11B 7/135*     (2006.01)
*G11B 5/02*      (2006.01)

(52) U.S. Cl. .................. 360/125.31; 360/59; 369/13.33; 369/112.09; 369/112.14; 369/112.21; 369/112.27

(58) Field of Classification Search .................... 360/59, 360/128, 125.31, 125.74; 369/13.33, 112.09, 369/112.14, 112.21, 112.27
See application file for complete search history.

(56) References Cited

U.S. PATENT DOCUMENTS

| | | | | |
|---|---|---|---|---|
| 5,199,090 A | * | 3/1993 | Bell ................................ | 385/33 |
| 6,999,384 B2 | * | 2/2006 | Stancil et al. .............. | 369/13.32 |
| 7,310,206 B2 | * | 12/2007 | Liu et al. ........................ | 360/317 |
| 7,538,978 B2 | * | 5/2009 | Sato et al. ...................... | 360/128 |
| 2006/0005216 A1 | * | 1/2006 | Rausch ........................... | 720/659 |
| 2006/0143635 A1 | * | 6/2006 | Liu et al. ........................ | 720/659 |
| 2006/0187564 A1 | * | 8/2006 | Sato et al. ....................... | 360/59 |

FOREIGN PATENT DOCUMENTS

| | | | | |
|---|---|---|---|---|
| JP | 05274836 A | * | 10/1993 | |
| JP | 06012723 A | * | 1/1994 | |
| JP | 07057411 A | * | 3/1995 | |
| JP | 07103726 A | * | 4/1995 | |
| JP | 10-162444 | | 6/1998 | |
| JP | 2000-173093 | | 6/2000 | |
| JP | 2000193580 A | * | 7/2000 | |
| JP | 2001-255254 | | 9/2001 | |

(Continued)

OTHER PUBLICATIONS

Miyanishi et al., "Near-Field Assisted Magnetic Recording", *IEEE Transactions on Magnetics*, vol. 41, No. 10, pp. 2817-2821, Oct. 2005.

(Continued)

*Primary Examiner* — William J Klimowicz
(74) *Attorney, Agent, or Firm* — Oliff & Berridge, PLC

(57) ABSTRACT

A thermally assisted magnetic head has a slider having a medium-facing surface, and a light source unit having a light source support substrate, and a light source disposed on the light source support substrate; the slider has a slider substrate and a magnetic head portion disposed on a side surface of the slider substrate; the magnetic head portion has a magnetic recording element for generating a magnetic field, first and second waveguides, for receiving light through an end face and guiding the light to the medium-facing surface, and a near-field light generator disposed on an end face; the light source support substrate is fixed to a surface of the slider substrate so that light emitted from the light source can enter the end face of the first waveguide.

9 Claims, 10 Drawing Sheets

FOREIGN PATENT DOCUMENTS

| | | |
|---|---|---|
| JP | 2001-283404 | 10/2001 |
| JP | 2001-325756 | 11/2001 |
| JP | 2002-298302 | 10/2002 |
| JP | 2004-158067 | 6/2004 |
| JP | 2004-303299 | 10/2004 |
| JP | 2006-185548 | 7/2006 |
| WO | WO 92/02931 | 2/1992 |
| WO | WO 98/09284 | 3/1998 |
| WO | WO 99/53482 | 10/1999 |

OTHER PUBLICATIONS

Shono et al., "Review of Thermally Assisted Magnetic Recording" Journal of Magnetics Society of Japan, vol. 29, No. 1, pp. 5-13, 2005.

* cited by examiner

TRACK WIDTH DIRECTION (A)

(B)

(C)

(D)

(A)

(B)

(C)

LAPPING

THERMALLY ASSISTED MAGNETIC HEAD

BACKGROUND OF THE INVENTION

1. Field of the Invention

The present invention relates to a thermally assisted magnetic head for writing of signals by thermally assisted magnetic recording, a head gimbal assembly (HGA) with this thermally assisted magnetic head, and a hard disk drive with this HGA, and to methods of producing them.

2. Related Background of the Invention

As the recording density of the hard disk drive increases, further improvement is demanded in the performance of the thin film magnetic head. The thin film magnetic head commonly used is a composite type thin film magnetic head of a structure in which a magnetic detecting element such as a magneto-resistive (MR) effect element and a magnetic recording element such as an electromagnetic coil element are stacked, and these elements are used to read and write data signals from and into a magnetic disk as a magnetic recording medium.

In general, the magnetic recording medium is a kind of a discontinuous body of fine magnetic particles aggregated, and each of the fine magnetic particles is made in a single magnetic domain structure. A recording bit is composed of a plurality of fine magnetic particles. Therefore, in order to increase the recording density, it is necessary to decrease the size of the fine magnetic particles and thereby decrease unevenness at borders of recording bits. However, the decrease in the size of the fine magnetic particles raises the problem of degradation of thermostability of magnetization due to decrease of volume.

A measure of the thermostability of magnetization is given by $K_U V/k_B T$. In this case, $K_U$ represents the magnetic anisotropy energy of the fine magnetic particles, V the volume of one magnetic particle, $k_B$ the Boltzmann constant, and T absolute temperature. The decrease in the size of fine magnetic particles is nothing but decrease in V, and, without any countermeasures, the decrease in V will lead to decrease of $K_U V/k_B T$ and degradation of the thermostability. A conceivable countermeasure to this problem is to increase $K_U$ at the same time, but this increase of $K_U$ will lead to increase in the coercive force of the recording medium. In contrast to it, the intensity of the writing magnetic field by the magnetic head is virtually determined by the saturation magnetic flux density of a soft magnetic material making the magnetic poles in the head. Therefore, the writing becomes infeasible if the coercive force exceeds a tolerance determined from this limit of writing magnetic field intensity.

As a method of solving this problem of thermostability of magnetization there is the following proposal of so-called thermally assisted magnetic recording: while a magnetic material with large $K_U$ is used, heat is applied to the recording medium immediately before application of the writing magnetic field, to decrease the coercive force, and writing is performed in that state. This recording is generally classified under magnetic dominant recording and optical dominant recording. In the magnetic dominant recording, the dominant of writing is an electromagnetic coil element and the radiation diameter of light is larger than the track width (recording width). On the other hand, in the optical dominant recording, the dominant of writing is a light radiating portion and the radiation diameter of light is approximately equal to the track width (recording width). Namely, the magnetic field determines the spatial resolution in the magnetic dominant recording, whereas the light determines the spatial resolution in the optical dominant recording.

Patent Documents (International Publication WO92/02931 (JP-A 6-500194), International Publication WO98/09284 (JP-A 2002-511176), Japanese Patent Application Laid-Open No. 10-162444, International Publication WO99/53482 (JP-A 2002-512725), Japanese Patent Application Laid-Open No. 2000-173093, Japanese Patent Application Laid-Open No. 2002-298302, Japanese Patent Application Laid-Open No. 2001-255254) and Non-patent Document (Shintaro Miyanishi et al., "Near-field Assisted Magnetic Recording" IEEE TRANSACTIONS ON MAGNETICS, 2005, Vol. 41, No. 10, pp 2817-2821) disclose the thermally assisted magnetic head recording apparatus of this type, in the structure in which a light source such as a semiconductor laser is located at a position apart from a slider with a magnetic recording element for generating a magnetic field and in which light from this light source is guided through an optical fiber, a lens, etc. to a medium-facing surface of the slider.

Furthermore, Patent Documents (Japanese Patent Application Laid-Open No. 2001-283404, Japanese Patent Application Laid-Open No. 2001-325756, Japanese Patent Application Laid-Open No. 2004-158067, Japanese Patent Application Laid-Open No. 2004-303299) and Non-patent Document (Keiji Shono and Mitsumasa Oshiki "Status and Problems of Thermally Assisted Magnetic Recording" Journal of the Magnetics Society of Japan, 2005, Vol. 29, No. 1, pp 5-13) disclose the thermally assisted magnetic head in which the magnetic recording element and the light source are integrated on a side surface of the slider, and the thermally assisted magnetic head in which the magnetic recording element and the light source are integrated on the medium-facing surface of the slider.

SUMMARY OF THE INVENTION

However, when the light source is located at the place far from the slider, the optical fiber, lens, mirror, etc. have to be used over a long distance for guiding light, which poses a problem of large reduction in propagation efficiency of light and a problem of complicated structure of the entire apparatus.

When the light source, in addition to the magnetic recording element, is integrated on the side surface of the slider, the yield of the thermally assisted magnetic head is likely to largely decrease by virtue of synergetic effect of the yield of the magnetic recording element and the yield of the light source.

For example, in the case of a laser diode (semiconductor laser) chip as an example of the light source, such characteristics as the output, the spread angle of laser light, and the life largely vary according to stress on the chip. It is thus necessary to perform characteristic tests of the chip after the chip is mounted on a substrate or the like. As a result, the yield of the magnetic head portion and the yield of the laser diode part both cumulatively affect the production yield of the entire head, so as to heavily degrade the yield of the entire head.

Furthermore, when the magnetic recording element and the light source are integrated on the medium-facing surface of the slider, the yield problem similar to that described above also arises and, because in this method the magnetic recording element and the magnetic detecting element are formed on the medium-facing surface different from the side surface of the slider on which the magnetic recording element and the magnetic detecting element used to be formed, it is difficult to apply the production methods of the conventional magnetic detecting elements, for example, such as the perpendicular conduction giant magneto-resistive (CPP (Current Perpendicular to Plane)-GMR) effect element and the magnetic recording element with the electromagnetic coil for perpendicular magnetic recording, and it is thus very difficult to produce the thermally assisted magnetic head with sufficient performance.

A conceivable solution to these problems is a method of fabricating a light source unit with a light source on a light source support substrate, separately from the slider, and laying and fixing it on a surface opposite to the medium-facing surface of the slider. In this case, the slider with the magnetic head portion, and the light source unit are tested independently of each other and thereafter the nondefective slider and light source unit are fixed to each other, which permits the thermally assisted magnetic head to be produced with a good yield. Furthermore, since in this case the light source can be disposed at a position apart from the medium-facing surface and near the slider, this method is free of the aforementioned problems of decrease of light propagation efficiency and complicated structure of the entire apparatus.

However, the method of separately fabricating the slider and the light source unit has another problem as described below. When the thermally assisted magnetic head is constructed in a configuration wherein a waveguide with a near-field light generator is provided in the magnetic head portion disposed on a side of the medium-facing surface of the slider, wherein light from the light source in the light source unit is guided into this waveguide and to the near-field light generator disposed on the medium-facing surface side of the waveguide, and wherein near-field light generated from the near-field light generator is made to act on the medium, it is difficult to achieve accurate positioning (alignment) between the light source and the waveguide on the occasion of fixing the slider and the light source unit. The reason is that the near-field light is not a traveling wave, detection thereof is hard, and it is difficult to achieve the alignment by a method of finely adjusting the relative positions of the slider and the light source unit with emission of light from the light source and fixing the slider and the light source unit at positions where the intensity of the near-field light becomes maximum. This degradation of alignment accuracy leads eventually to decrease in efficiency of heating of the medium and is thus a significant problem in the thermally assisted magnetic recording.

An object of the present invention is therefore to provide a thermally assisted magnetic head that can be produced at an increased yield, that can be produced by applying the production methods of the conventional magnetic recording elements, that can be constructed in a simple structure, and that has a light source located at an accurately adjusted position, an HGA with this thermally assisted magnetic head, and a hard disk drive with this HGA, and to provide methods of producing them.

Before explaining the present invention, the terms to be used in the specification are defined as follows. In a multilayer structure of a magnetic head portion formed on an integration surface of a slider, a constituent element on the slider side with respect to a reference layer will be defined as an element located "under" or "below" the reference layer, and a constituent element on the stack side with respect to the reference layer will be defined as an element located "over" or "above" the reference layer.

A thermally assisted magnetic head according to the present invention comprises: a slider having a medium-facing surface; and a light source unit having a light source support substrate and a light source disposed on the light source support substrate; the slider has a slider substrate and a magnetic head portion disposed on a side of the medium-facing surface in the slider substrate. The magnetic head portion includes a magnetic recording element for generating a magnetic field, first and second waveguides for receiving light through an end face thereof opposite to the medium-facing surface, and guiding the light to the medium-facing surface, and a near-field light generator disposed on an end face on the medium-facing surface side of the first waveguide; the light source support substrate is fixed to a surface opposite to the medium-facing surface in the slider substrate so that light emitted from the light source can enter the end face of the first waveguide.

A production method of a thermally assisted magnetic head according to the present invention comprises preparing a slider comprising: a slider substrate and a magnetic head portion disposed on a side of a medium-facing surface in the slider substrate, said magnetic head portion having a magnetic recording element for generating a magnetic field, first and second waveguides for receiving light through an end face thereof opposite to the medium-facing surface, and guiding the light to the medium-facing surface, and a near-field light generator disposed on an end face on the medium-facing surface side of the first waveguide; and a light source unit comprising a light source support substrate and a light source disposed on the light source support substrate; a first alignment step of letting the light source emit light in a state in which the light source unit is located on a surface opposite to the medium-facing surface of the slider, and moving relative positions of the slider and the light source unit so as to maximize an intensity of light detected by a photodetector located opposite to an end face on the medium-facing surface side of the second waveguide; a second alignment step of moving the relative positions of the slider and the light source unit in a direction and by a distance preliminarily determined based on a positional relation between the second waveguide and the first waveguide, after the first alignment step; and a fixing step of fixing the slider substrate and the light source support substrate after the second alignment step.

According to the present invention, the magnetic head portion is fixed to the slider substrate and the light source is fixed to the light source support substrate; therefore, the thermally assisted magnetic head as a nondefective device can be produced with a good yield by first testing the magnetic recording element fixed to the slider substrate and the light source fixed to the light source support substrate independently of each other and thereafter fixing the slider as a nondefective unit and the light source unit as a nondefective unit to each other.

Since the magnetic head portion is disposed on the side surface of the slider substrate, the magnetic recording element of the magnetic head portion can be readily produced by applying the conventional thin-film magnetic head production methods.

Since the light source is located at the position apart from the medium-facing surface and near the slider, it is feasible to suppress adverse effect of heat generated from the light source, on the magnetic recording element and others, and possibilities of contact or the like between the light source and the medium, to reduce propagation loss of light because of dispensability of an optical fiber, a lens, a mirror, etc., and to simplify the structure.

Furthermore, the magnetic head portion comprises the second waveguide without the near-field light generator. This permits us to implement accurate alignment between the first waveguide and the light source in the following manner: the light source is activated to emit light, the relative positions of the slider and the light source unit are moved so as to maximize the intensity of light emerging from the second waveguide, thereby first achieving alignment between the second waveguide, which permits easier detection of the emerging light in the absence of the near-field light generator, and the light source, and thereafter, the relative positions of the slider and the light source unit are moved by a distance and in a direction preliminarily determined according to the positional relation of the first waveguide with the second waveguide.

Preferably, the light source is disposed on a side surface of the light source support substrate, which facilitates fixing of the light source to the light source support substrate.

Preferably, the first waveguide has a width in a track width direction larger than a thickness in a direction perpendicular to the track width direction, and the first waveguide and the second waveguide are separated from each other in the track width direction.

The first waveguide of this shape is required, particularly, to achieve sufficiently high alignment accuracy between the light source and the first waveguide in the direction perpendicular to the track width direction. Thus, the first alignment step is carried out to achieve the alignment between the light source and the second waveguide through the use of the second waveguide and then the second alignment step is carried out to relatively move the light source unit relative to the slider only in the track width direction. Through this process, the high alignment accuracy between the light source and the second waveguide in the direction perpendicular to the track width direction, which was achieved in the first alignment step, is taken over by the first waveguide separated in the track width direction, after the second alignment step. Accordingly, extremely accurate alignment can be achieved in the direction perpendicular to the track width direction between the first waveguide and the light source.

Preferably, the first waveguide and the second waveguide have their respective thicknesses equal to each other in the direction perpendicular to the track width direction.

This facilitates production of the magnetic head portion including the first waveguide and the second waveguide.

A head gimbal assembly according to the present invention comprises any one of the above-described thermally assisted magnetic heads, and a suspension supporting the thermally assisted magnetic head.

A hard disk drive according to the present invention comprises the above-described head gimbal assembly, and a magnetic recording medium.

The present invention provides the thermally assisted magnetic head produced at an improved yield, permitting application of the conventional magnetic recording element production methods, constructed in the simplified structure, and having the light source at the accurately adjusted position, the HGA with this thermally assisted magnetic head, the hard disk drive with this HGA, and the production methods of these.

DESCRIPTION OF THE PREFERRED EMBODIMENTS

Figure 1:
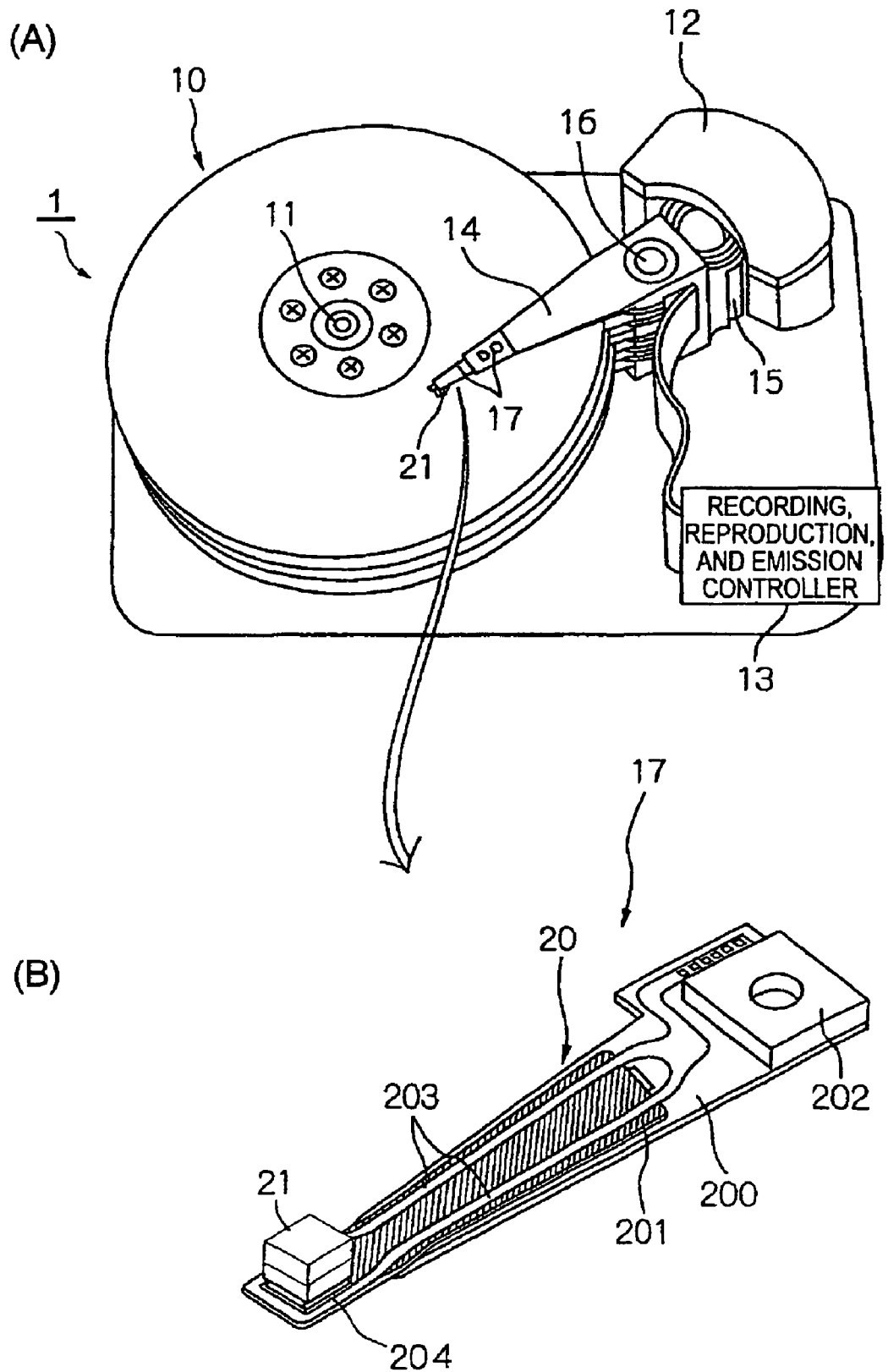
FIG. 1 is a perspective view schematically showing a configuration of a major part in an embodiment of a hard disk drive and HGA according to the present invention.

Embodiments for carrying out the present invention will be described below in detail with reference to the accompanying drawings. In each of the drawings, the same elements will be denoted by the same reference numerals. It is also noted that the dimensional ratios in and between the constituent elements in the drawings are arbitrary, for easier understanding of the drawings.

Figure 2:
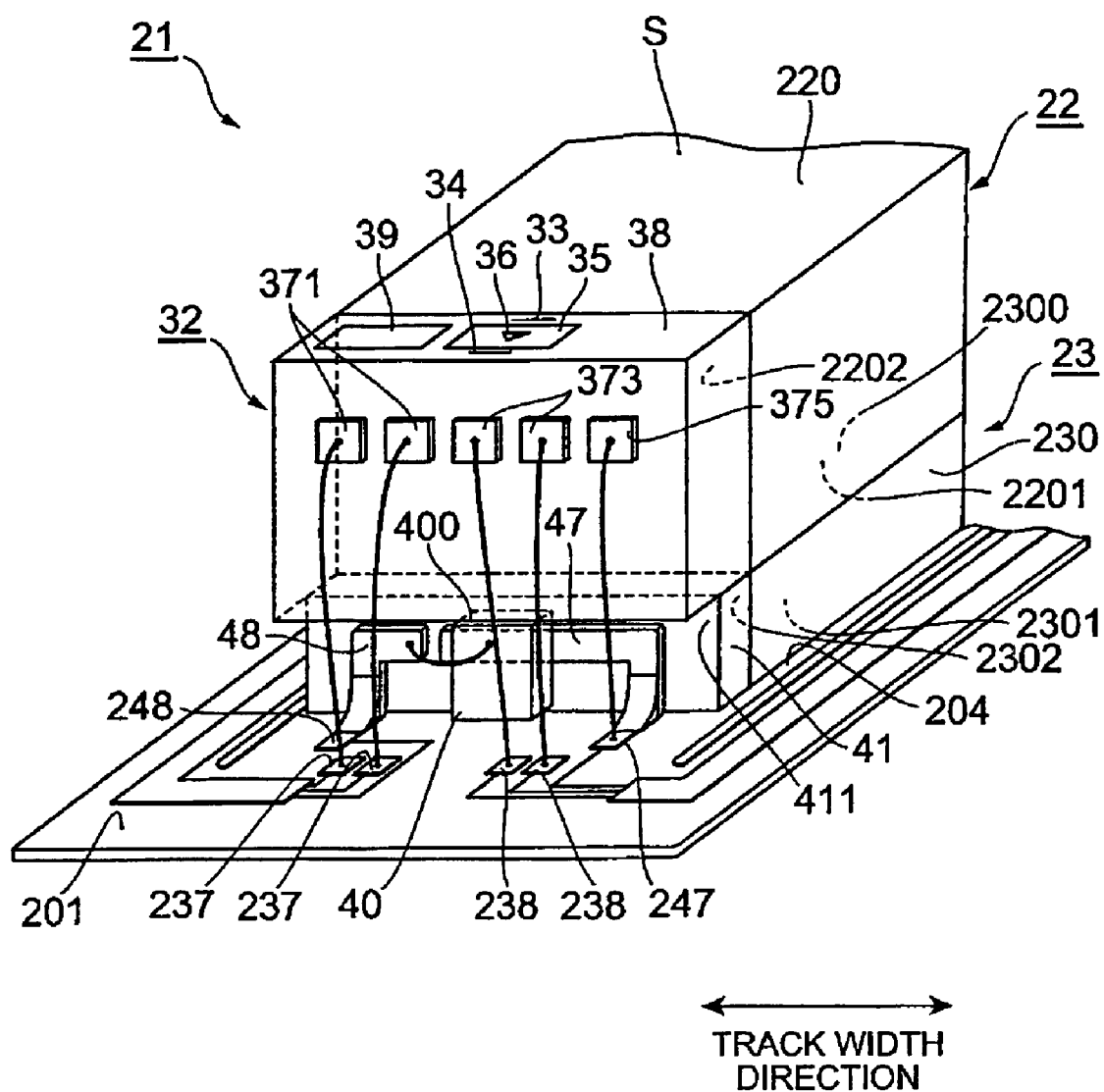
FIG. 2 is an enlarged perspective view of a part near a distal end of the HGA in FIG. 1.

FIG. 1 is a perspective view schematically showing a configuration of a major part in an embodiment of the hard disk drive and HGA (head gimbal assembly) according to the present invention. FIG. 2 is an enlarged perspective view of a part near a thermally assisted magnetic head 21 in FIG. 1. In the perspective view of the HGA, the side of the HGA facing a surface of a magnetic disk is illustrated up.

(Hard Disk Drive)

In FIG. 1(A), the hard disk drive 1 has magnetic disks 10 consisting of a plurality of magnetic recording media to rotate around a rotation shaft of spindle motor 11, an assembly carriage device 12 for positioning each thermally assisted magnetic head 21 on a track, and a recording, reproduction, and emission control circuit (control circuit) 13 for controlling writing and reading operations of each thermally assisted magnetic head 21 and for controlling a laser diode as a light source for emitting laser light for thermally assisted magnetic recording, which will be detailed later.

The assembly carriage device 12 is provided with a plurality of drive arms 14. These drive arms 14 are angularly rockable around a pivot bearing shaft 16 by voice coil motor (VCM) 15, and are stacked in the direction along this shaft 16. An HGA 17 is attached to the distal end of each drive arm 14. Each HGA 17 is provided with a thermally assisted magnetic head 21 so that it faces the surface of each magnetic disk 10. The surface of the magnetic head 21 facing the surface of the magnetic disk 10 is a medium-facing surface S (which is also called an air bearing surface) of the thermally assisted magnetic head 21. The number of each of magnetic disks 10, drive arms 14, HGAs 17, and thermally assisted magnetic heads 21 may be one.

(HGA)

The HGA 17 is constructed, as shown in FIG. 1(B), by fixing the thermally assisted magnetic head 21 to a distal end of suspension 20 and electrically connecting one end of wiring member 203 to terminal electrodes of the thermally assisted magnetic head 21. The suspension 20 is composed mainly of a load beam 200, a flexure 201 with elasticity fixed and supported on this load beam 200, a tongue portion 204 formed in a plate spring shape at the tip of the flexure, a base plate 202 disposed on the base part of the load beam 200, and a wiring member 203 disposed on the flexure 201 and consisting of a lead conductor and connection pads electrically connected to the both ends of the lead conductor.

The wiring member, as shown in FIG. 2, has a pair of electrode pads 237, 237 for recording signal, a pair of electrode pads 238, 238 for readout signal, and a pair of electrode pads 247, 248 for driving of the light source.

It is obvious that the structure of the suspension in the HGA 17 of the present invention is not limited to the above-described structure. An IC chip for driving of the head may be mounted midway in the suspension 20, though not shown.

(Thermally Assisted Magnetic Head)

Figure 3:
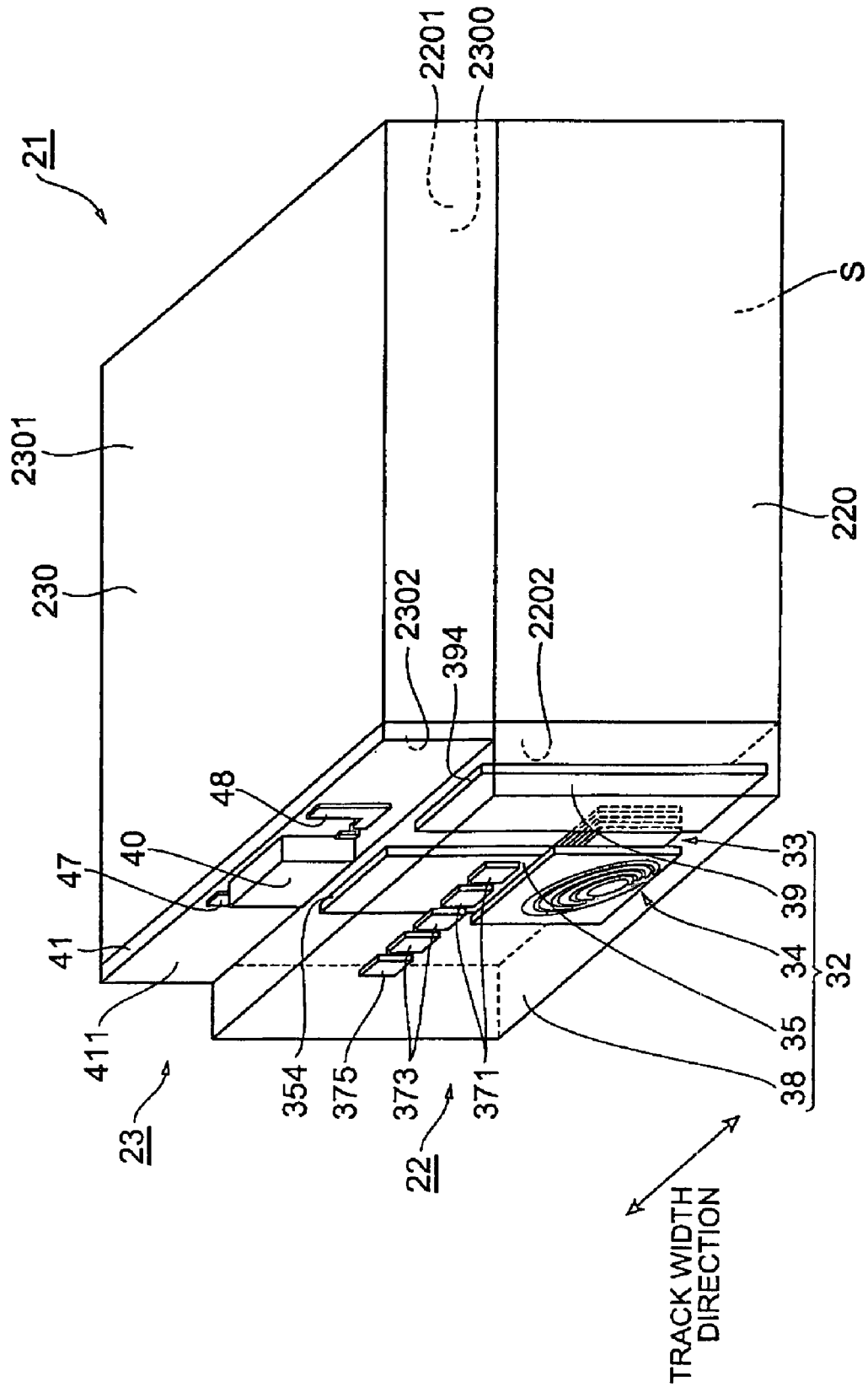
FIG. 3 is a perspective view schematically showing a configuration of a thermally assisted magnetic head in FIG. 1.
Figure 4:
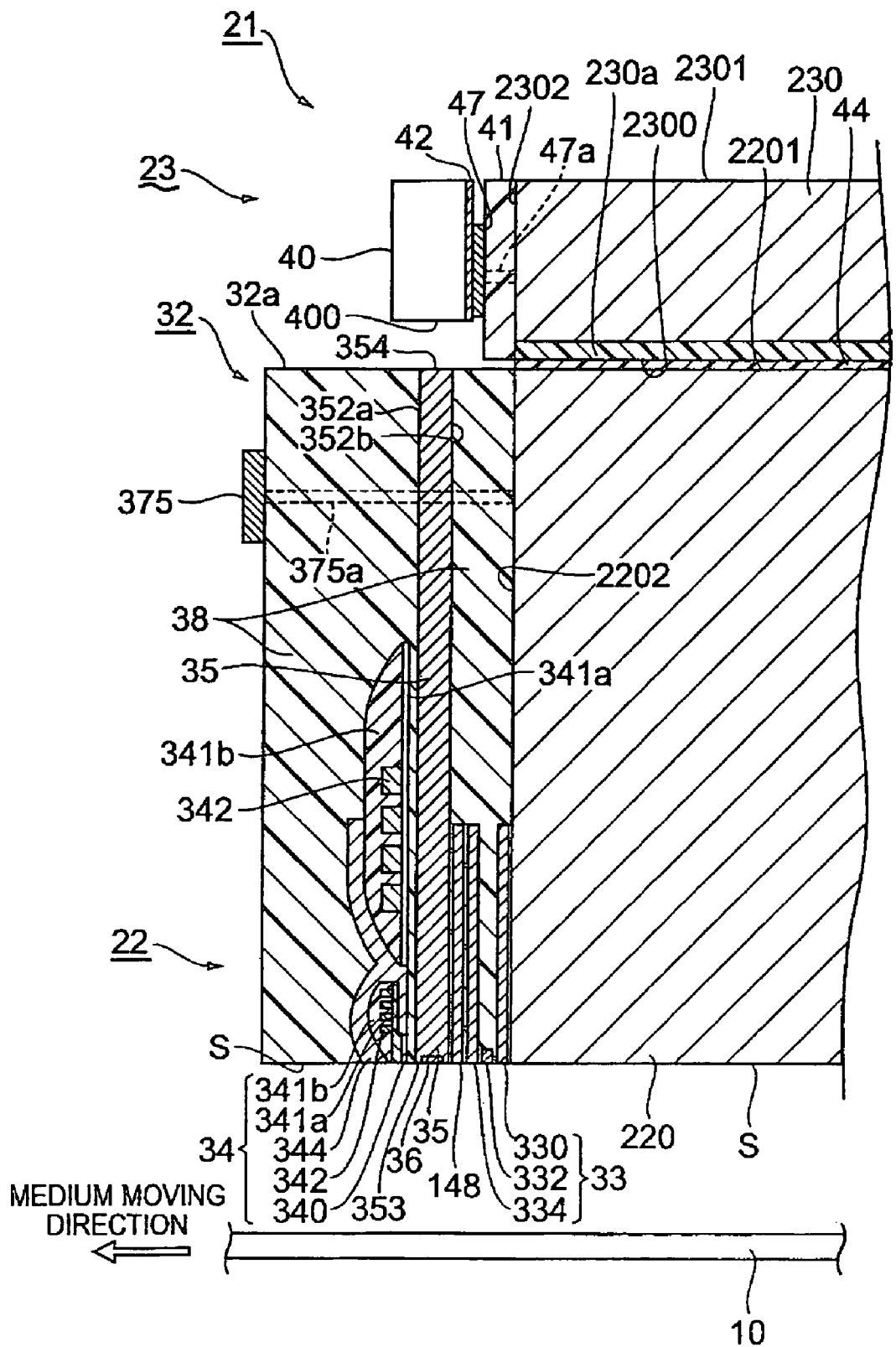
FIG. 4 is a sectional view perpendicular to a medium-facing surface of the thermally assisted magnetic head in FIG. 3.

As shown in FIGS. 2 to 4, the thermally assisted magnetic head 21 has a configuration in which a slider 22, and a light source unit 23 having a light source support substrate 230 and a laser diode 40 as a light source for thermally assisted magnetic recording are bonded and fixed to each other so that a back surface 2201 of a slider substrate 220 is in contact with a bond surface 2300 of the light source support. substrate 230. The back surface 2201 of the slider substrate 220 herein is a surface opposite to the medium-facing surface S of the slider 22. A bottom surface 2301 of the light source support substrate 230 is bonded to the tongue portion 204 of the flexure 201, for example, with an adhesive such as epoxy resin.

(Slider)

The slider 22 has a slider substrate 220, and a magnetic head portion 32 for performing writing and reading of data signal.

The slider substrate 220 is of a plate shape and has the medium-facing surface S processed so as to achieve an appropriate levitation amount The slider substrate 220 is made of electrically conductive AlTiC ($Al_2O_3$—TiC) or the like.

The magnetic head portion 32 is formed on an integration surface 2202 which is a side surface approximately perpendicular to the medium-facing surface S of the slider substrate 220. The magnetic head portion 32 has an MR effect element 33 as a magnetic detecting element for detecting magnetic information; an electromagnetic coil element 34 as a perpendicular (or, possibly, longitudinal) magnetic recording element for writing magnetic information by generation of a magnetic field; a first waveguide 35 as a planar waveguide provided through between the MR effect element 33 and the electromagnetic coil element 34; a second waveguide 39 as a planar waveguide provided at a position separate in the track width direction from the first waveguide 35; a near-field light generator 36 for generating near-field light for heating a recording layer portion of a magnetic disk; an insulating layer 38 formed on the integration surface 2202 so as to cover these MR effect element 33, electromagnetic coil element 34, first waveguide 35, second waveguide 39, and near-field light generator 36; a pair of electrode pads 371, 371 for signal terminals exposed from the layer surface of the insulating layer 38 and connected to the MR effect element 33; a pair of electrode pads 373, 373 for signal terminals connected to the electromagnetic coil element 34; and an electrode pad 375 for ground electrically connected to the slider substrate 220. The end faces of the MR effect element 33, electromagnetic coil element 34, and near-field light generator 36 are exposed in the medium-facing surface S. Each of the elements will be described below in detail.

FIG. 4 is a sectional view of the part near the magnetic head portion of the thermally assisted magnetic head 21. As shown in FIG. 4, the MR effect element 33 includes an MR laminate 332, and a lower shield layer 330 and an upper shield layer 334 located at respective positions on both sides of this MR laminate 332. The lower shield layer 330 and the upper shield layer 334 can be made, for example, of a magnetic material of NiFe, CoFeNi, CoFe, FeN, FeZrN, or the like and in the thickness of about 0.5-3 μm by a pattern plating method including a frame plating method, or the like. The upper and lower shield layers 334 and 330 prevent the MR laminate 332 from being affected by an external magnetic field serving as noise.

The MR laminate 332 includes a magneto-resistance effect film such as an in-plane conduction type (CIP (Current In Plane)) Giant Magneto Resistance (GMR) multilayer film, a perpendicular conduction type (CPP (Current Perpendicular to Plane)) GMR multilayer film, or a Tunnel Magneto Resistance (TMR) multilayer film, and is sensitive to a signal magnetic field from the magnetic disk with very high sensitivity.

For example, when the MR laminate 332 includes a TMR effect multilayer film, it has a structure in which the following layers are stacked in order: an antiferromagnetic layer made of IrMn, PtMn, NiMn, RuRhMn, or the like and in the thickness of about 5-15 nm; a magnetization fixed layer comprised, for example, of CoFe or the like as a ferromagnetic material, or two layers of CoFe or the like with a nonmagnetic metal layer of Ru or the like in between, and having the magnetization direction fixed by the antiferromagnetic layer; a tunnel barrier layer of a nonmagnetic dielectric material made, for example, by oxidizing a metal film of Al, AlCu, or the like about 0.5-1 nm thick by oxygen introduced into a vacuum chamber, or by natural oxidation; and a magnetization free layer comprised, for example, of two layered films of CoFe or the like about 1 nm thick and NiFe or the like about 3-4 nm thick as a ferromagnetic material, and effecting tunnel exchange coupling through the tunnel barrier layer with the magnetization fixed layer.

An interelement shield layer 148 made of the same material as the lower shield layer 330 is formed between the MR effect element 33 and the first waveguide 35. The interelement shield layer 148 performs a function of shielding the MR effect element 33 from a magnetic field generated by the electromagnetic coil element 34 and preventing external noise during readout. A backing coil portion may also be further formed between the interelement shield layer 148 and the first waveguide 35. The backing coil portion generates a magnetic flux to cancel a magnetic flux loop generated by the electromagnetic coil element 34 and passing via the upper and lower electrode layers of the MR effect element 33, and thereby suppresses the Wide Area Track Erasure (WATE) phenomenon being an unwanted writing or erasing operation on the magnetic disk.

The insulating layer 38 made of alumina or the like is formed between the shield layers 330, 334 on the opposite side to the medium-facing surface S of the MR laminate 332, on the opposite side to the medium-facing surface S of the shield layers 330, 334, 148, between the lower shield layer 330 and the slider substrate 220, and between the interelement shield layer 148 and the first waveguide 35.

When the MR laminate 332 includes a CIP-GMR multilayer film, upper and lower shield gap layers for insulation of alumina or the like are provided between each of the upper and lower shield layers 334 and 330, and the MR laminate 332. Furthermore, an MR lead conductor layer for supplying a sense current to the MR laminate 332 to extract reproduction output is formed though not shown. On the other hand, when the MR laminate 332 includes a CPP-GMR multilayer film or a TMR multilayer film, the upper and lower shield layers 334 and 330 also function as upper and lower electrode layers, respectively. In this case, the upper and lower shield gap layers and MR lead conductor layer are unnecessary and omitted.

A hard bias layer of a ferromagnetic material such as CoTa, CoCrPt, or CoPt, for applying a vertical bias magnetic field for stabilization of magnetic domains, is formed on both sides in the track width direction of the MR laminate 332, though not shown.

The electromagnetic coil element 34 is preferably one for perpendicular magnetic recording and, as shown in FIG. 4, has a main magnetic pole layer 340, a gap layer 341a, a coil insulating layer 341b, a coil layer 342, and an auxiliary magnetic pole layer 344.

Figure 5:
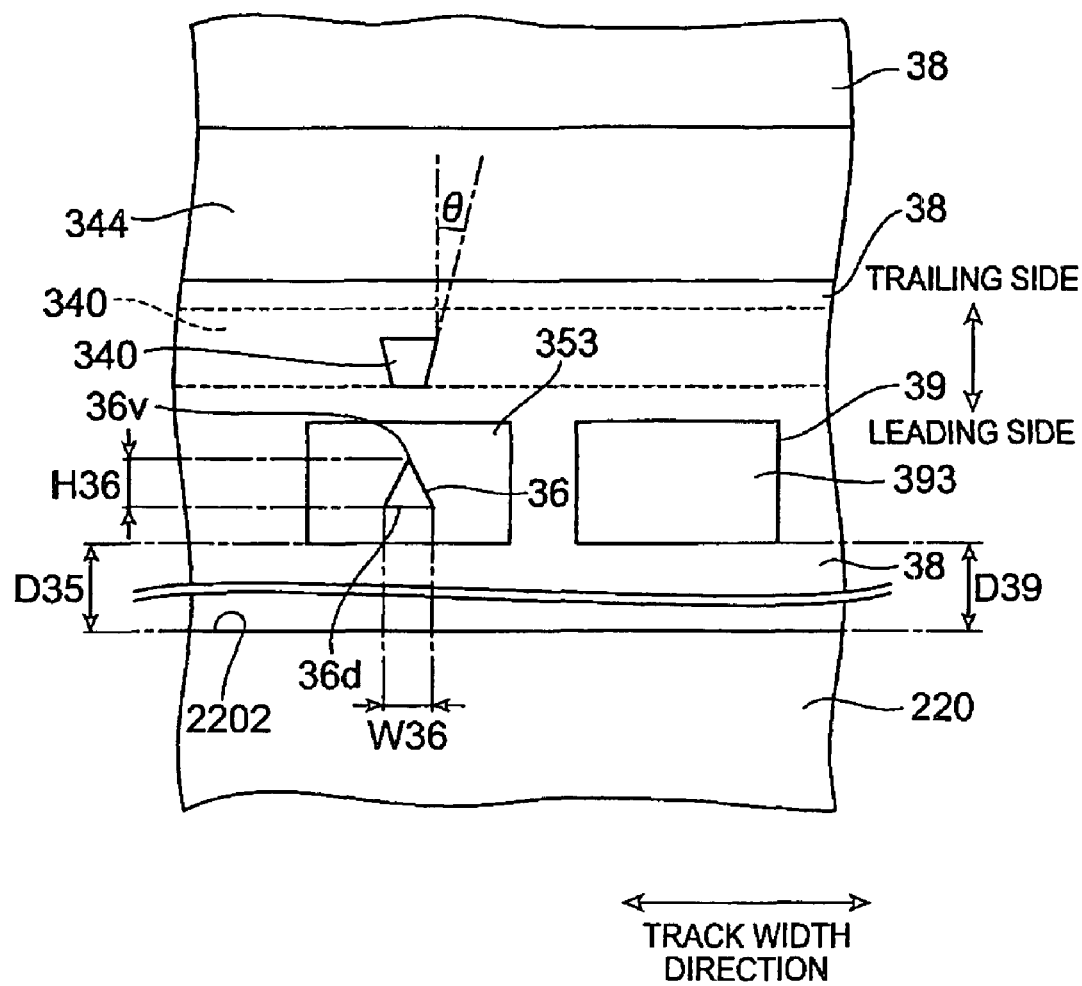
FIG. 5 is a schematic view from the medium-facing surface of the thermally assisted magnetic head in FIG. 4.

The main magnetic pole layer 340 is a magnetic guide for guiding a magnetic flux induced by the coil layer 342, up to the recording layer of the magnetic disk (medium) as a target of writing, while converging the magnetic flux. The end of the main magnetic pole layer 340 on the medium-facing surface S side preferably has a width in the track width direction (depth direction in FIG. 4) and a thickness in the stack direction (horizontal direction in FIG. 4) smaller than those of the other portions. This results in permitting the main magnetic pole layer to generate a fine and strong writing magnetic field adapted for high recording density. Specifically, for example, as shown in FIG. 5 which is a view of the magnetic head portion from the medium-facing surface S side, the tip of the main magnetic pole layer 340 on the medium-facing surface S side is preferably tapered in a shape of an inverted trapezoid whose length of the side on the leading side or slider substrate 220 side is shorter than the length of the side on the tailing side. Namely, the end face of the main magnetic pole layer 340 on the medium-facing surface side is provided with a bevel angle $\theta$, in order to avoid unwanted writing or the like on an adjacent track by influence of a skew angle made by actuation with a rotary actuator. The magnitude of the bevel angle $\theta$ is, for example, approximately 15°. In practice, the writing magnetic field is generated mainly near the longer side on the trailing side and in the case of the magnetic dominant recording, the length of this longer side determines the width of the writing track.

Here the main magnetic pole layer 340 is preferably made, for example, in the total thickness of about 0.01 to about 0.5 μm at the end portion on the medium-facing surface S side and in the total thickness of about 0.5 to about 3.0 μm at the portions other than this end portion and, for example, of an alloy of two or three out of Ni, Fe, and Co, or an alloy containing the foregoing elements as main ingredients and doped with a predetermined element by frame plating, sputtering, or the like. The track width can be, for example, 100 nm.

As shown in FIG. 4, the end portion of the auxiliary magnetic pole layer 344 on the medium-facing surface S side forms a trailing shield portion wider in a layer section than the other portion of the auxiliary magnetic pole layer 344. The auxiliary magnetic pole layer 344 is opposed through the gap layer 341a and coil insulating layer 341b made of an insulating material such as alumina, to the end of the main magnetic pole layer 340 on the medium-facing surface S side. When the auxiliary magnetic pole layer 344 of this configuration is provided, the magnetic field gradient becomes steeper between the auxiliary magnetic pole layer 344 and the main magnetic pole layer 340 near the medium-facing surface S. This results in decreasing jitter of signal output and permitting decrease in the error rate during readout.

The auxiliary magnetic pole layer 344 is made, for example, in the thickness of about 0.5 to about 5 μm and, for example, of an alloy of two or three out of Ni, Fe, and Co, or an alloy containing these as principal ingredients and doped with a predetermined element by frame plating, sputtering, or the like.

The gap layer 341a separates the coil layer 342 from the main magnetic pole layer 340 and is made, for example, in the thickness of about 0.01 to about 0.5 μm and, for example, of $Al_2O_3$ or DLC or the like by sputtering, CVD, or the like.

The coil layer 342 is made, for example, in the thickness of about 0.5 to about 3 μm and, for example, of Cu or the like by frame plating or the like. The rear end of the main magnetic pole layer 340 is coupled with the portion of the auxiliary magnetic pole layer 344 apart from the medium-facing surface S and the coil layer 342 is formed so as to surround this coupling portion.

The coil insulating layer 341b separates the coil layer 342 from the auxiliary magnetic pole layer 344 and is made, for example, in the thickness of about 0.1 to about 5 μm and of an electric insulating material such as thermally cured alumina or resist layer or the like.

Figure 6:
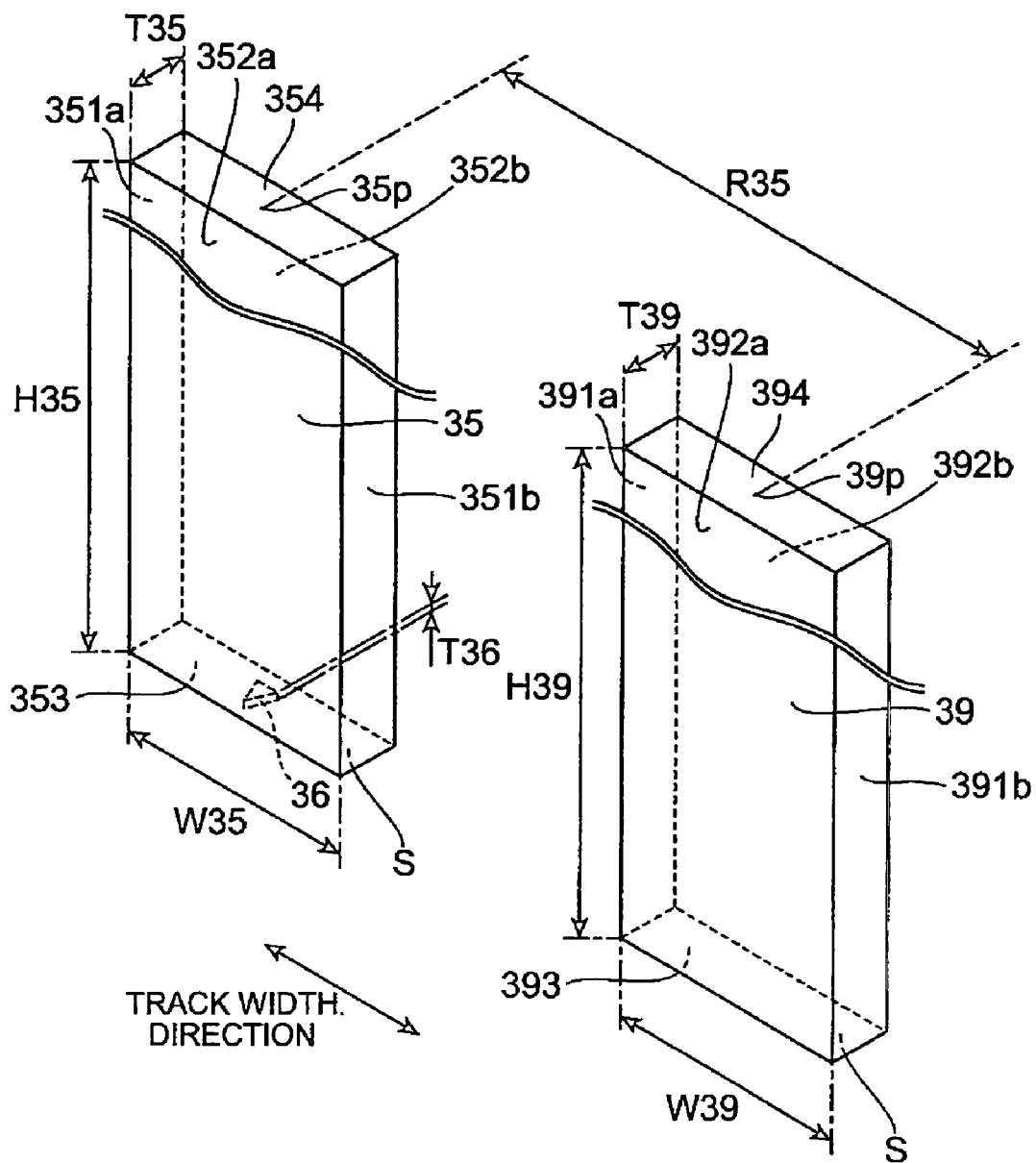
FIG. 6 is a perspective view showing a first waveguide, a second waveguide, and a near-field light generator in the thermally assisted magnetic head in FIG. 3.

The first waveguide 35, as shown in FIG. 4 and FIG. 5, is located between the MR effect element 33 and the electromagnetic coil element 34 and at a position separate by a distance of D35 in the direction perpendicular to the track width direction from the integration surface 2202 so as to extend in parallel with the integration surface 2202, extends from the medium-facing surface S of the magnetic head portion 32 to the surface 32a opposite to the medium-facing surface of the magnetic head portion 32, and is of a rectangular plate shape, as shown in FIG. 6 (A).

The first waveguide 35 has two side faces 351a, 351b opposed in the track width direction, and two upper face 352a and lower face 352b parallel to the integration surface 2202, all of which are formed perpendicularly to the medium-facing surface S, and the first waveguide 35 also has an exit face 353 forming the medium-facing surface S, and an entrance face 354 opposite to the exit face 353. The upper face 352a, the lower face 352b, and the two side faces 351a, 351b of the first waveguide 35 are in contact with the insulating layer 38 having the refractive index smaller than that of the first waveguide 35 and functioning as a cladding for the first waveguide 35.

This first waveguide 35 is able to guide light incident through the entrance face 354, to the exit face 353 as the end face on the medium-facing surface S side, while reflecting the light on the two side faces 351a, 351b, the upper face 352a, and the lower face 352b. The width W35 of the first waveguide 35 in the track width direction in FIG. 6 (A) can be, for example, 1-200 μm, the thickness T35, for example, 2-10 μm, and the height H35 10-300 μm. An aspect ratio of the entrance face 354 and the exit face 353, which is defined as a value obtained by dividing the value of width W35 by the value of thickness T35, can be, for example, 1-20 and preferably 3-20.

The first waveguide 35 is made, for example, by sputtering or the like, from a dielectric material which has the refractive index n higher than that of the material making the insulating layer 38, everywhere. For example, in a case where the insulating layer 38 is made of $SiO_2$ (n=1.5), the first waveguide 35 may be made of $Al_2O_3$ (n=1.63). Furthermore, in a case where the insulating layer 38 is made of $Al_2O_3$ (n=1.63), the first waveguide 35 may be made of $Ta_2O_5$ (n=2.16), $Nb_2O_5$ (n=2.33), TiO (n=2.3-2.55), or $TiO_2$ (n=2.3-2.55). When the first waveguide 35 is made of one of such materials, the total reflection condition is met at the interface, in addition to the good optical characteristics of the material itself, so as to decrease the propagation loss of laser light and increase the efficiency of generation of near-field light.

The near-field light generator 36, as shown in FIGS. 2, 4, 5, and 6, is a platelike member disposed nearly in the center of the exit face 353 of the first waveguide 35. As shown in FIGS.

4 and 6, the near-field light generator 36 is buried in the exit face 353 of the first waveguide 35 so that the end face thereof is exposed in the medium-facing surface S. As shown in FIG. 5, the near-field light generator 36 is of a triangular shape when viewed from the medium-facing surface S, and is made of an electroconductive material. The base 36d of the triangle is arranged in parallel with the integration surface 2202 of the slider substrate 220 or in parallel with the track width direction, and the vertex 36v facing the base is arranged on the main magnetic pole layer 340 side of the electromagnetic coil element 34 with respect to the base 36d; specifically, the vertex 36v is arranged opposite to the leading edge of the main magnetic pole layer 340. A preferred form of the near-field light generator 36 is an isosceles triangle whose two base angles at the two ends of the base 36d are equal to each other.

The near-field light generator 36 is preferably made of Au, Ag, Al, Cu, Pd, Pt, Rh, or Ir, or an alloy as a combination of two or more selected from the foregoing elements.

In FIG. 5, the radius of curvature of the vertex 36v is preferably 5-100 nm. The height H36 of the triangle is preferably sufficiently smaller than the wavelength of incident laser light and preferably 20-400 nm. The width W of the base 36d is preferably sufficiently smaller than the wavelength of incident laser light and preferably 20-400 nm. The thickness T36 of the near-field light generator 36 in FIG. 6 is preferably 10-100 nm.

When the near-field light generator 36 is disposed on the exit face 353 of the first waveguide 35, the electric field is concentrated near the vertex 36v of the near-field light generator 36 and the near-field light is generated from near the vertex 36v toward the medium. This will be detailed later.

The second waveguide 39, as shown in FIGS. 3, 5, and 6, is located as separated in the track width direction from the first waveguide 35 and a distance R35 (cf. FIG. 6) in the track width direction from a center point 39p of an entrance face 394 of the second waveguide 39 to a center point 35p of the entrance face 354 of the first waveguide 35 is preferably not more than 100 μm. A distance D39 (cf. FIG. 5) between the integration surface 2202 and the second waveguide 39 in the direction perpendicular to the track width direction is equal to the distance D35 between the first waveguide 35 and the integration surface 2202.

The shape and material of the second waveguide 39 are the same as those of the first waveguide 35, except that there is no near-field light generator provided. Specifically, the second waveguide 39 extends in parallel with the integration surface 2202, extends from the medium-facing surface S of the magnetic head portion 32 to the surface 32a opposite to the medium-facing surface of the magnetic head portion 32, and is of a rectangular plate shape, as shown in FIG. 6(B). The second waveguide 39 has two side faces 391a, 391b opposed in the track width direction, and two upper face 392a and lower face 392b parallel to the integration surface 2202, all of which are formed perpendicularly to the medium-facing surface S, and the second waveguide 39 also has an exit face 393 forming the medium-facing surface S, and an entrance face 394 opposite to the exit face 393. The upper face 392a, the lower face 392b, and the two side faces 391a, 391b of the second waveguide 39 are in contact with the insulating layer 38 having the refractive index smaller than that of the second waveguide 39 and functioning as a cladding for the second waveguide 39.

This second waveguide 39 is able to guide light incident through the entrance face 394, to the exit face 393 as the end face on the medium-facing surface S side, while reflecting the light on the two side faces 391a, 391b, the upper face 392a, and the lower face 392b, as the first waveguide 35 was. The second waveguide 39 is used for alignment on the occasion of fixing the slider substrate 220 and the light source support substrate 230, as described below. The width W39, thickness T39, and height H39 in FIG. 6 and the aspect ratio of the entrance face 394 and exit face 393 of the second waveguide 39 are the same as the values of the respective corresponding portions of the first waveguide 35. Particularly, since the thicknesses T35 and T39 of the first waveguide 35 and the second waveguide 39 in the direction perpendicular to the track width direction are equal, the process is simplified in production of the magnetic head portion 32 including these.

The second waveguide 39 is made, for example, by sputtering or the like, from a dielectric material which has the refractive index n higher than that of the material making the insulating layer 38, everywhere as the first waveguide 35 was. This dielectric material is preferably the same material as the first waveguide 35 in terms of simplification of the production process, but may any other material that satisfies the above condition for the refractive index n.

In this slider 22, as shown in FIG. 2, the electrode pads :371, 371 are electrically connected through bonding wires to the respective electrode pads 237, 237 of the flexure 201, and the electrode pads 373, 373 are connected through bonding wires to the respective electrode pads 238, 238 of the flexure 201; this configuration allows each of the electromagnetic coil element and the MR effect element to be driven. The electrode pad 375 electrically connected through a via hole 375a in FIG. 4 to the slider substrate 220 is connected through a bonding wire to the electrode pad 247 of the flexure 201, as shown in FIG. 2, whereby a potential of the slider substrate 220 can be controlled, for example, to the ground potential by the electrode pad 247.

(Light Source Unit)

The components of the light source unit 23 in the thermally assisted magnetic head 21 will be described below.

As shown in FIGS. 2 to 4, the light source unit 23 mainly has a light source support substrate 230 and a laser diode (light source) 40 whose contour is platelike.

The light source support substrate 230 is a substrate of AlTiC (Al$_2$O$_3$—TiC) or the like and has the bond surface 2300 bonded to the back surface 2201 of the slider substrate 220. As shown in FIG. 4, a heat insulation layer 230a of alumina or the like is formed on the bond surface 2300. An insulating layer 41 of an insulating material such as alumina is disposed on an element forming surface 2302 being one side surface when the bond surface 2300 is regarded as a bottom surface. The electrode pads 47, 48 are formed on this insulating layer 41, and the laser diode 40 is fixed on the electrode pad 47.

More specifically, as shown in FIGS. 2 and 3, the electrode pads 47, 48 are formed for driving of laser, on a surface 411 intersecting with the front surface of the insulating layer 41 and with the medium-facing surface S and, in other words, they are formed on the surface 411 parallel to the integration surface 2202 of the slider substrate 2210. The electrode pad 47, as shown in FIG. 4, is electrically connected through a via hole 47a provided in the insulating layer 41, to the light source support substrate 230. The electrode pad 47 also functions as a heat sink for leading heat during driving of the laser diode 40 through the via hole 47a to the light source support substrate 230 side.

The electrode pad 47, as shown in FIG. 2, is formed so as to extend in the track width direction in the central region of the surface 411 of the insulating layer 41. On the other hand, the electrode pad 48 is formed at a position separate in the track width direction from the electrode pad 47. Each of the electrode pads 47, 48 further extends toward the flexure 201 side, for connection with the flexure 201 by solder reflow.

The electrode pads 47, 48 are electrically connected to the electrode pads 247, 248 of the flexure 201, respectively, by reflow soldering, whereby the light source can be driven. Since the electrode pad 47 is electrically connected to the light source support substrate 230 as described above, the potential of the light source support substrate 230 can be controlled, for example, to the ground potential by the electrode pad 247.

The electrode pads 47, 48 can be comprised, for example, of layers of Au, Cu, or the like made in the thickness of about 1-3 µm and by vacuum evaporation, sputtering, or the like, which are formed, for example, through a ground layer of Ta, Ti, or the like about 10 nm thick.

The laser diode 40 is electrically connected onto the electrode pad 47 by a solder layer 42 (cf. FIG. 4) of an electrically conductive solder material such as Au—Sn. At this time, the laser diode 40 is located relative to the electrode pad 47 so as to cover only a part of the electrode pad 47.

Figure 7:
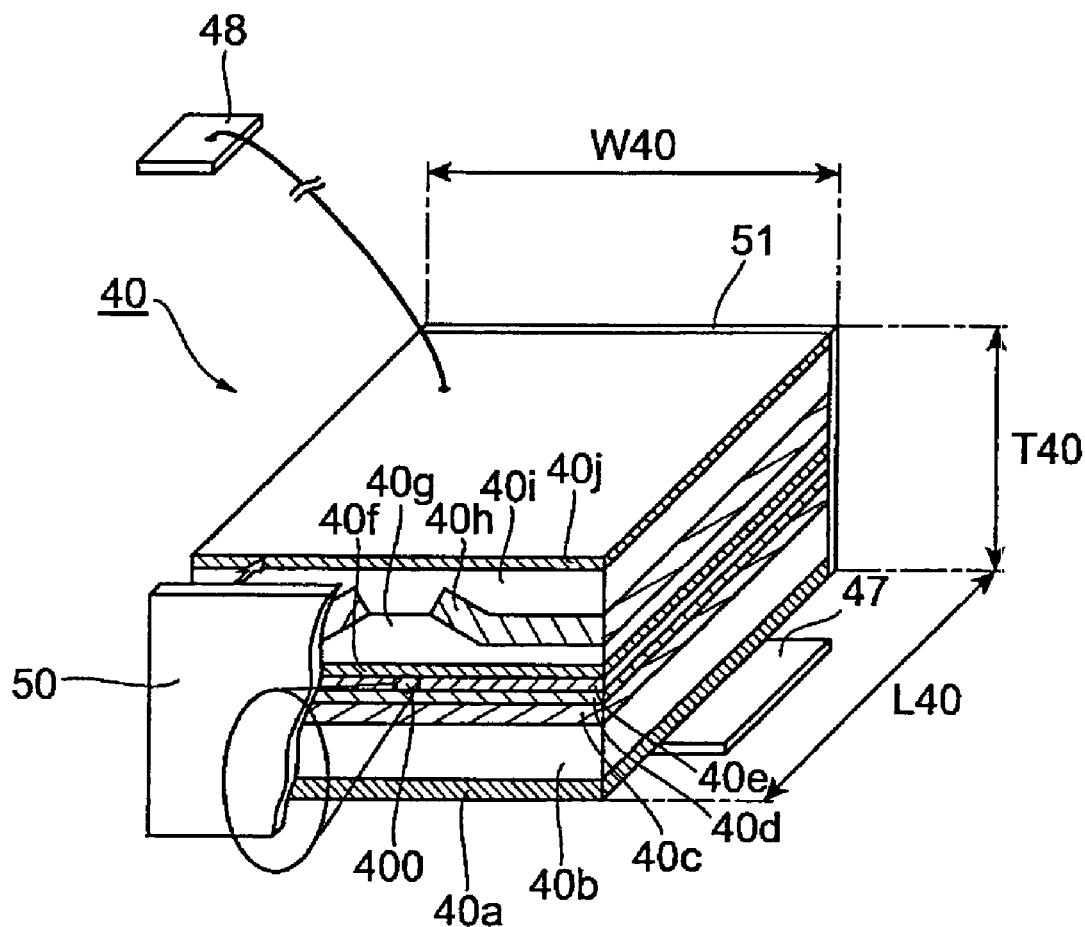
FIG. 7 is a schematic perspective view showing a configuration of a laser diode.

As shown in FIG. 7, the laser diode 40 may have the same structure as the one normally used for an optical disk storage, and, for example, has a structure in which the following layers are stacked in order: an n-electrode 40a; an n-GaAs substrate 40b; an n-InGaAlP cladding layer 40c; a first InGaAlP guide layer 40d; an active layer 40e consisting of multiple quantum wells (InGaP/InGaAlP) or the like; a second InGaAlP guide layer 40f; a p-InGaAlP cladding layer 40g; an *n-GaAs current blocking layer 40h; a p-GaAs contact layer 40i; a p-electrode 40j. Reflecting films 50 and 51 of $SiO_2$, $Al_2O_3$, or the like for exciting oscillation by total reflection are deposited before and after cleavage faces of the multilayer structure, and an aperture is provided at the position of the active layer 40e in one reflecting film 50, at an output end 400 for emission of laser light. The laser diode 40 of this configuration emits laser light from the output end 400 when a voltage is applied thereto in the film thickness direction.

The wavelength $\lambda_L$ of the emitted laser light is, for example, approximately 600-650 nm. It should be, however, noted that there is an appropriate excitation wavelength according to the metal material of the near-field light generator 36 (FIG. 2). For example, in a case where Au is used for the near-field light generator 36, the wavelength $\lambda_L$ of the laser light is preferably near 600 nm.

The size of the laser diode 40 is, for example, the width (W40) of 200-350 µm, the length (depth L40) of 250-600 µm, and the thickness (T40) of about 60-200 µm, as described above. The width W40 of the laser diode 40 can be decreased, for example, to about 100 µm, while the minimum thereof is a spacing between opposed ends of the current blocking layer 40h. However, the length of the laser diode 40 is the quantity associated with the electric current density and thus cannot be decreased so much. In either case, the laser diode 40 is preferably dimensioned in a sufficient size, in consideration of handling during mounting.

A power supply in the hard disk drive can be used for driving of this laser diode 40. In practice, the hard disk drive is usually equipped, for example, with the power supply of about 2 V, which is a sufficient voltage for the lasing operation. The power consumption of the laser diode 40 is also, for example, approximately several ten mW, which the power supply in the hard disk drive can fully provide.

In FIG. 4, the n-electrode 40a of the laser diode 40 is fixed to the electrode pad 47 by the solder layer 42 such as AuSn. The laser diode 40 is fixed to the light source support substrate 230 so that the output end 400 of the laser diode 40 is directed downward in FIG. 4, i.e., so that the output end 400 becomes parallel to the bond surface 2300; whereby the output end 400 can face the entrance face 354 of the first waveguide 35 of the slider 22. In practical fixing of the laser diode 40, for example, an evaporated film of AuSn alloy is deposited in the thickness of about 0.7-1 µm on the surface of the electrode pad 47, the laser diode 40 is mounted thereon, and thereafter it is heated to be fixed, to about 200-300° C. by a hot plate or the like under a hot air blower. As shown in FIGS. 2 and 7, the electrode pad 48 is electrically connected through a bonding wire to the p-electrode 40j of the laser diode 40. The electrode connected to the electrode pad 47 may also be the p-electrode 40j, instead of the n-electrode 40a, and in this case, the n-electrode 40a is connected through a bonding wire to the electrode pad 48.

In the case of soldering with the aforementioned AuSn alloy, the light source unit is heated, for example, to the high temperature of about 300° C., but according to the present invention, this light source unit 23 is produced separately from the slider 22; therefore, the magnetic head portion in the slider is prevented from being adversely affected by this high temperature.

The back surface 2201 of the aforementioned slider 22 and the bond surface 2300 of the light source unit 23 are bonded, for example, with an adhesive layer 44 such as a UV cure type adhesive, as shown in FIG. 4, and the output end 400 of the laser diode 40 is arranged opposite to the entrance face 354 of the first waveguide 35.

The configurations of the laser diode 40 and the electrode pads do not always have to be limited to those in the above-described embodiment, of course, and, for example, the laser diode 40 may be one of another configuration using other semiconductor materials, such as GaAlAs type materials. Furthermore, it is also possible to use any other brazing material, for the soldering between the laser diode 40 and the electrode. Yet furthermore, the laser diode 40 may be formed directly on the unit substrate by epitaxially growing the semiconductor materials.

(Production Method)

Subsequently, a method of producing the thermally assisted magnetic head described above will be described below.

First, the slider 22 is produced. Specifically, the slider substrate 220 is prepared, the MR effect element 33 and interelement shield layer 148 are formed by well-known methods, and the insulating layer 38 of alumina or the like is further formed as a ground layer.

Figure 8:
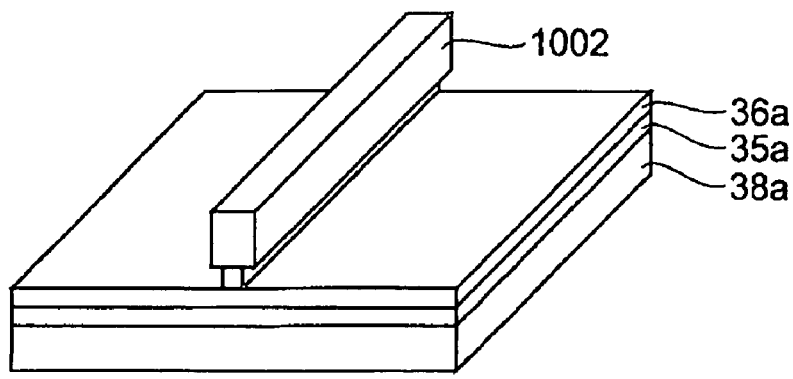
FIG. 8 is perspective views showing a production method of the first waveguide, second waveguide, and near-field light generator in order of (A)-(D).
Figure 8:
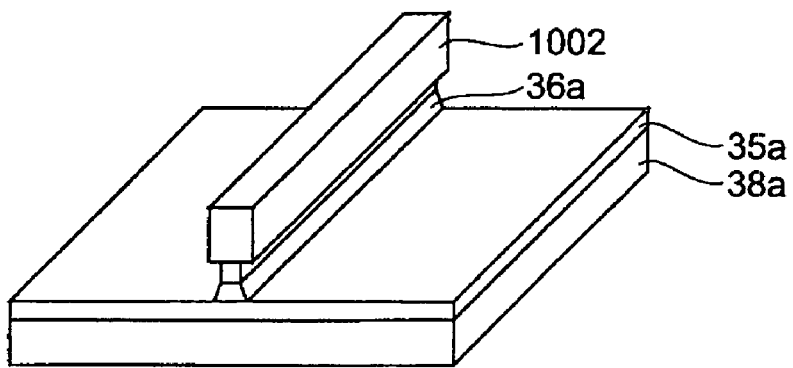
Figure 8:
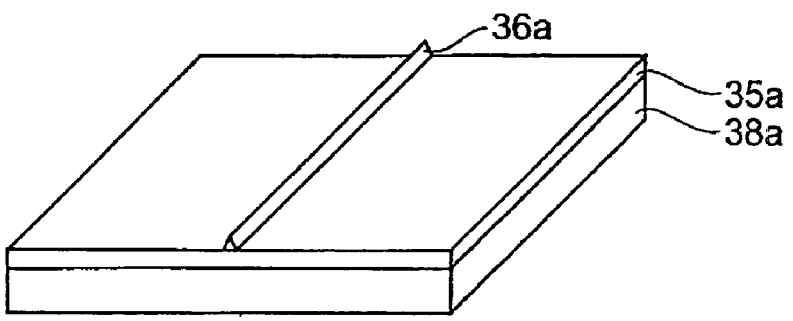
Figure 8:
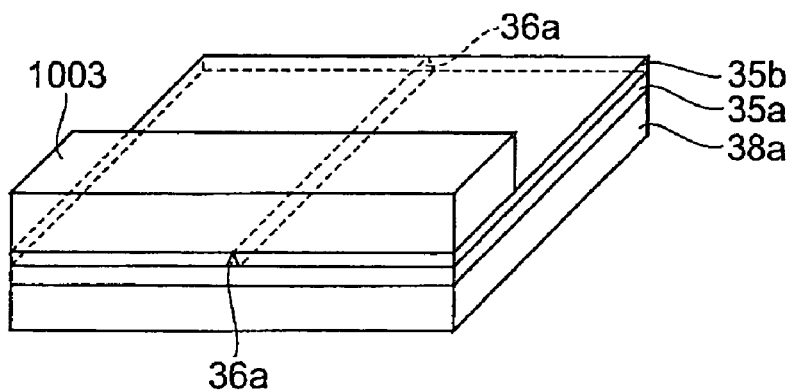
Figure 9:
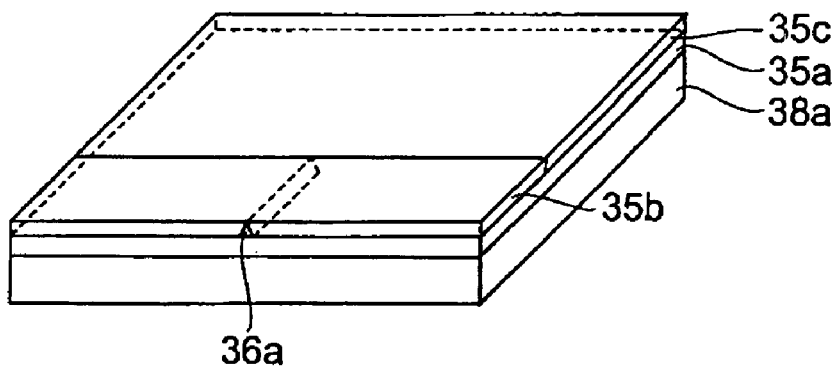
FIG. 9 is perspective views, subsequent to FIG. 8, showing the production method of the first waveguide, second waveguide, and near-field light generator in order of (A)-(C).
Figure 9:
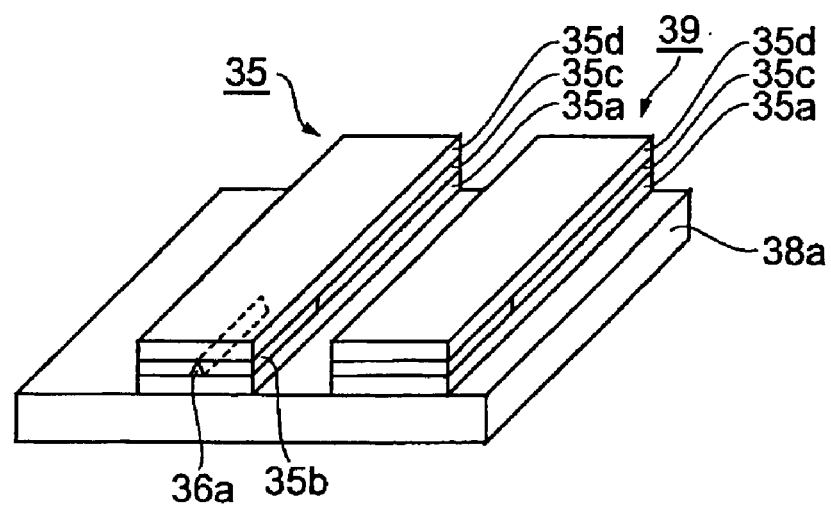
Figure 9:
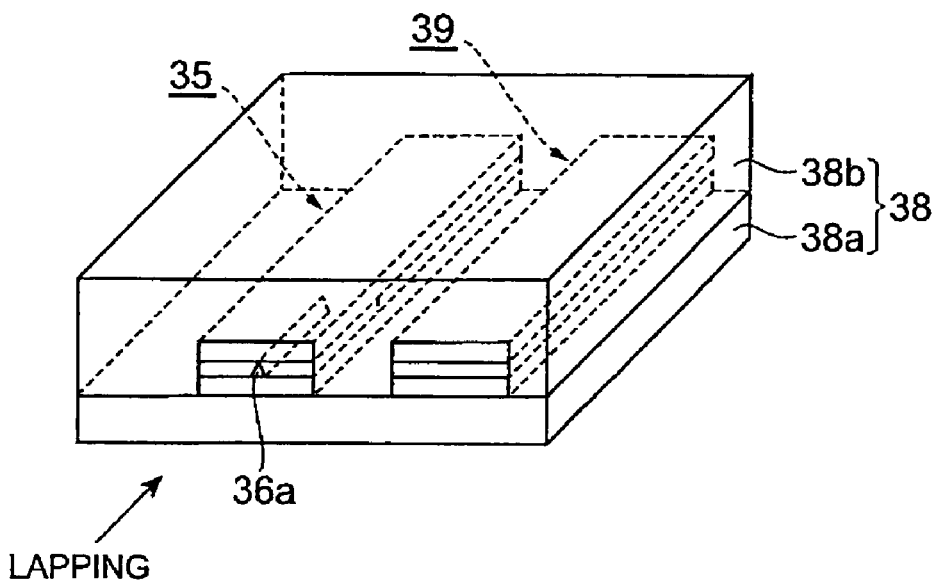

Subsequently, the first waveguide 35, second waveguide 39, and near-field light generator 36 are formed. This process will be described in detail with reference to FIGS. 8 and 9. FIGS. 8 and 9 are perspective views to illustrate an embodiment of the method of forming the first waveguide 35, the second waveguide 39, and the near-field light generator 36.

In the first step, as shown in (A) of FIG. 8, a dielectric film 35a of $Ta_2O_5$ or the like with the refractive index higher than that of the insulating layer 38a, which will be parts of the first waveguide 35 and the second waveguide 39, is first deposited on the insulating layer 38a of $Al_2O_3$ or the like, a metal layer 36a of Au or the like, which will be a part of the near-field light generator 36, is then deposited thereon, and a resist pattern 1002 depressed for liftoff in the bottom part is formed thereon.

In the next step, as shown in (B) of FIG. 8, unnecessary portions of the metal layer 36a are removed except immediately below the resist pattern 1002 by ion milling or the like, thereby forming a pattern of the metal layer 36a of a trapezoid shape wider in the bottom as deposited on the dielectric film 35a.

In the subsequent step, as shown in (C) of FIG. 8, the resist pattern 1002 is removed, and a part of each slope is removed from the two slope sides of the metal layer 36a of the trapezoid shape by ion milling or the like, to form the metal layer 36a in a triangular sectional shape.

Subsequently, as shown in (D) of FIG. 8, a dielectric film 35b of the same material as the dielectric film 35a is deposited on the dielectric film 35a so as to cover the metal layer 36a, a resist pattern 1003 for formation of the end face of the metal layer 36a is laid on the side where the medium-facing surface will be formed, the metal layer 36a and the dielectric film 35b are removed by ion milling or the like, from the side opposite to the side where the medium-facing surface will be formed, as shown in (A) of FIG. 9, and thereafter a dielectric film 35c of the same material as the dielectric film 35b is deposited on the removed portion.

Furthermore, as shown in (B) of FIG. 9, a dielectric film 35d of the same material as the dielectric film 35b is further deposited on the dielectric films 35b, 35c, and the dielectric films 35a, 35b, 35c, 35d are patterned in two rectangular plate shapes in the predetermined width, thereby almost completing the first waveguide 35 and the second waveguide 39.

Thereafter, as shown in (C) of FIG. 9, an insulating layer 38b of the same material as the insulating layer 38a is further formed so as to cover the first waveguide 35 and the second waveguide 39, thereby completing the insulating layer 38 as a cladding layer. Then lapping is performed by a predetermined distance from the side where the metal layer 36a is exposed, as described later, to form the near-field light generator 36 of the predetermined thickness and the medium-facing surface S.

The above steps can form the first waveguide 35 with the near-field light generator 36 therein and the second waveguide 39 without the near-field light generator.

After that, the electromagnetic coil element 34 is formed by the well-known method as shown in FIG. 4, and then the insulating layer 38 of alumina or the like is formed. Furthermore, the electrode pads 371 and others for connection are formed and thereafter lapping of the air bearing surface and the back surface thereof is performed to complete the slider 22. After this step, tests of the electromagnetic coil element 34 and the MR effect element 33 of slider 22 are conducted for each slider, to select a nondefective product.

Subsequently, the light source unit 23 is produced. In the first step, as shown in FIG. 4, the light source support substrate 230 of AlTiC or the like is prepared, the heat insulation layer 230a, insulating layer 41, and electrode pads 47, 48 are formed on the surfaces of the substrate by well-known methods, the laser diode 40 is fixed on the electrode pad 47 by an electrically conductive solder material such as AuSn, and thereafter the substrate is shaped into a predetermined size by separation by cutting or the like. This completes the light source unit 23. The light source unit obtained in this manner is also subjected to characteristic evaluation of the laser diode, particularly, observation of a profile of drive current by a high-temperature continuous conduction test, to select one considered to have a sufficiently long life.

After that, as shown in FIG. 10(A), a UV cure type adhesive 44a is applied onto either or both of the bond surface 2300 of the light source unit 23 as a nondefective unit and the back surface 2201 of the slider 22 as a nondefective unit. The UV cure type adhesive can be a UV cure type epoxy resin, a UV cure type acrylic resin, or the like.

In the next step, as shown in FIG. 10(B), the bond surface 2300 of the light source unit 23 and the back surface 2201 of the slider 22 are laid on each other so that the laser diode 40 is located above the entrance face 394 of the second waveguide 39. Then the laser diode 40 is activated with application of a voltage between the electrode pads 47, 48, and a photodetector DT is opposed to the exit face 393 of the second waveguide 39. The slider 22 and the light source unit 23 are relatively moved in directions of arrows in FIG. 10(B) to find out a position where the output from the photodetector DT becomes maximum (first alignment step).

Then, as shown in FIG. 10(C), the relative positions of the slider 22 and the light source unit 23 (relative positions of the slider substrate 220 and the light source support substrate 230) are moved by a distance and in a direction preliminarily determined corresponding to the positional relation of the first waveguide 35 with the second waveguide 39 (second alignment step), and at that position, UV light is applied from the outside onto the UV cure type adhesive to cure the UV cure type adhesive 44a, which can bond the light source unit 23 and the slider 22 to each other in a state in which the optical axis of the laser diode 40 is aligned with the optical axis of the first waveguide 35

Figure 10:
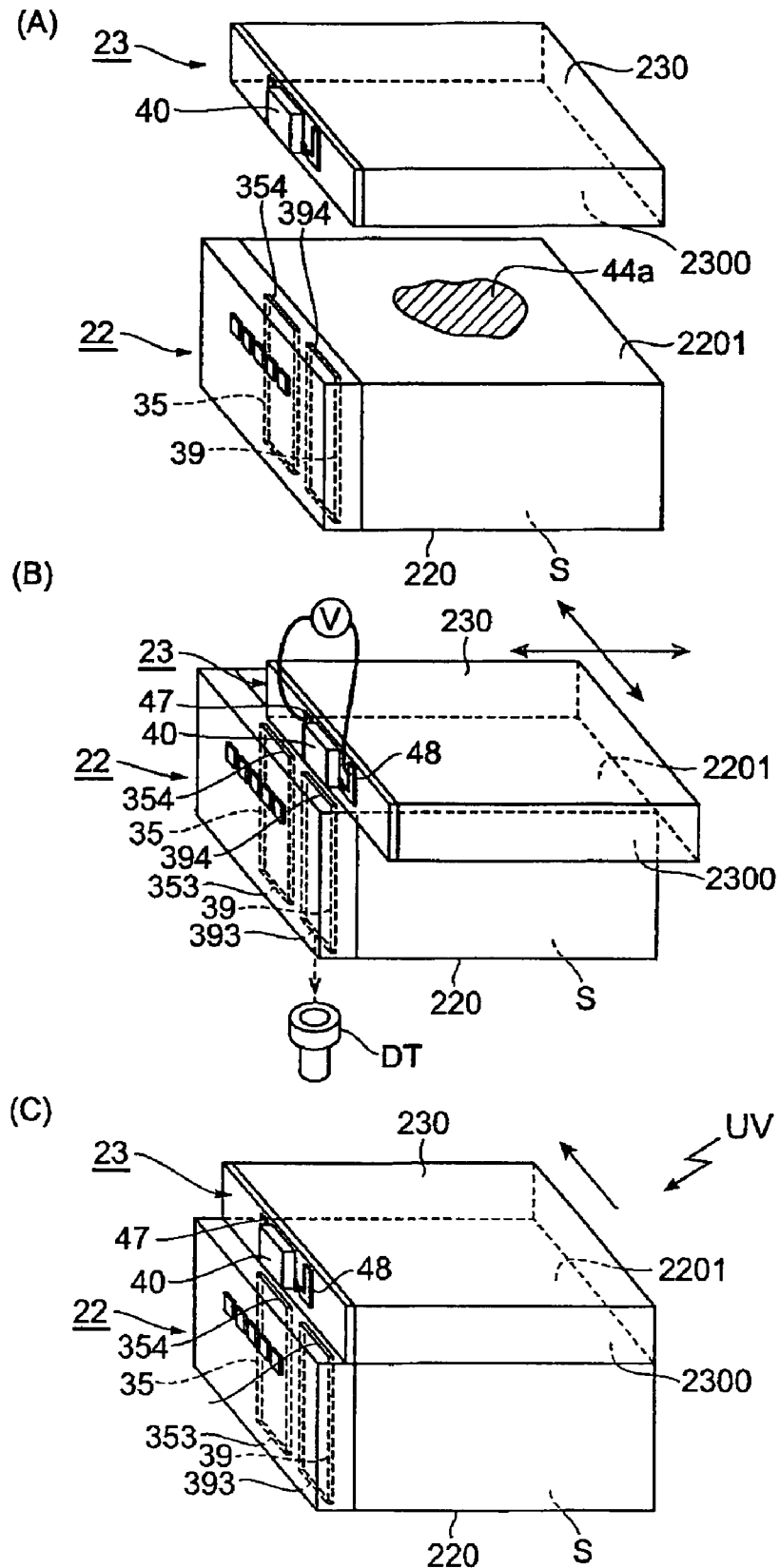
FIG. 10 is perspective views showing a production method of the thermally assisted magnetic head in order of (A)-(C).

Here the distance and the direction preliminarily determined corresponding to the positional relation of the first waveguide 35 with the second waveguide 39 are a distance and a direction necessary for the movement from the entrance face 394 to the entrance face 354 in FIGS. 6 and 10. The distance and direction are preferably those necessary for the movement from the center point 39p of the entrance face 394 to the center point 35p of the entrance face 354, as shown in FIG. 6.

Namely, in the case of the present embodiment, for example, the distance R35 from the center point 39p to the center point 35p is the predetermined distance, and the direction from the center point 39p toward the center point 35p is the predetermined direction. Since these predetermined distance and direction are determined by the process conditions for formation of the first waveguide 35 and the second waveguide 39, they can be accurately defined.

As the alignment is achieved between the slider 22 and the light source unit 23 as described above, accurate alignment can be effected between the first waveguide 35 and the laser diode 40 even though the first waveguide 35 is provided with the near-field light generator 36. Namely, since it is difficult to detect the near-field light generated from the near-field light generator 36 with incidence of light from the laser diode 40 into the first waveguide 35, it is hard to directly implement the alignment between the first waveguide 35 and the laser diode 40 while monitoring the near-field light However, it is easy to detect the light emerging from the exit face 393 of the second waveguide 39 with incidence of the light from the light source 40 into the second waveguide 39 without the near-field light generator 36, and it is thus easy to achieve accurate alignment in position between the second waveguide 39 and the laser diode 40 in the first alignment step. Then the alignment between the first waveguide 35 and the laser diode 40 can be readily and precisely made by moving the relative positions of the slider 22 and the light source unit 23 from the first aligned positions by the distance and in the direction, which can be preliminarily precisely determined based on measured values, designed values, or the like, in the second alignment step.

Especially, when the width W35 of the first waveguide 35 in the track width direction is larger than the thickness T35 in the direction perpendicular to the track width direction (or when the aspect ratio of the exit face 353 of the first waveguide 35 is large), the first waveguide 35 is required, particularly, to achieve high alignment accuracy with the light source 40 in the direction perpendicular to the track width direction In the present embodiment the first waveguide 35 and the second waveguide 39 are separated from each other in the track width direction. This provides the following effect: after the first alignment step is carried out to achieve the alignment between the second waveguide 39 and the light source 40 in the direction perpendicular to the track width direction through the use of the second waveguide 39, the second alignment step is carried out to move the light source unit 40 relative to the slider 22 by the distance of R35 only in the track width direction, whereby the first waveguide 35 takes over the extremely accurate alignment in the direction perpendicular to the track width direction between the second waveguide 39 and the light source 40 achieved in the first alignment step, without relative movement in the direction perpendicular to the track width direction in the second alignment step. As a result, deviation can be suppressed between the optical axis of the laser diode 40 and the optical axis of the first waveguide 35, and this leads to prevention of reduction in the efficiency of heating of the medium on the occasion of execution of the thermally assisted magnetic recording and to increase in the yield of the thermally assisted magnetic head.

The distance R35 is preferably not more than about 100 μm because very accurate movement can be made in the second alignment step.

(Action)

Subsequently, the action of the thermally assisted magnetic head 21 according to the present embodiment will be described below.

During a writing or reading operation, the thermally assisted magnetic head 21 hydromechanically floats up by a predetermined levitation amount above the surface of the rotating magnetic disk (medium) 10. On this occasion, the ends on the medium-facing surface S side of the MR effect element 33 and the electromagnetic coil element 34 are opposed through a small spacing to the magnetic disk 10, thereby implementing readout by sensing of a data signal magnetic field and writing by application of a data signal magnetic field.

On the occasion of writing of a data signal, the laser light having propagated from the light source unit 23 through the first waveguide 35 reaches the near-field light generator 36, whereupon the near-field light generator 36 generates the near-field light. This near-field light enables execution of thermally assisted magnetic recording as described below.

Here the near-field light generally has the maximum intensity at the border of the near-field light generator 36 when viewed from the medium-facing surface S, though it depends upon the wavelength of the incident laser light and the shape of the first waveguide 35. Particularly, the present embodiment is arranged as follows in FIG. 4: the stack direction of the laser diode 40 is the horizontal direction in FIG. 4; the electric field vector of the light arriving at the near-field light generator 36 is the horizontal direction in FIG. 4, i.e., the vertical direction in FIG. 5. Therefore, radiation of the strongest near-field light occurs near the vertex 36v. Namely, the part facing the vicinity of this vertex 36v becomes a major heat-acting portion in the thermal assist action to heat a portion of the recording layer of the magnetic disk with light.

Since the electric field intensity of this near-field light is immeasurably stronger than that of the incident light, this very strong near-field light rapidly heats the opposed local part of the surface of the magnetic disk. This reduces the coercive force of this local part to a level allowing writing with the writing magnetic field, whereby writing with the electromagnetic coil element 34 becomes feasible even with use of the magnetic disk of a high coercive force for high-density recording. The near-field light penetrates to the depth of about 10-30 nm from the medium-facing surface S toward the surface of the magnetic disk Therefore, under the present circumstances where the levitation amount is 10 nm or less, the near-field light can reach the recording layer part sufficiently. The width in the track width direction and the width in the medium moving direction of the near-field light generated in this manner are approximately equal to the aforementioned reach depth of the near-field light, and the electric field intensity of this near-field light exponentially decreases with increase in the distance; therefore, the near-field light can heat the recording layer part of the magnetic disk in an extremely localized area.

By adopting the thermally assisted magnetic recording as described above, it also becomes feasible to achieve, for example, the recording density of 1 Tbits/in$^2$ order, by performing writing on the magnetic disk of a high coercive force by means of the thin film magnetic head for perpendicular magnetic recording to record recording bits in an extremely fine size.

The present embodiment uses the light source unit 23, so that the laser light propagating in the direction parallel to the layer surface of the first waveguide 35 can be made incident to the entrance face (end face) 354 of the first waveguide 35 of the slider 22. Namely, the laser light of appropriate size and direction can be surely supplied in the thermally assisted magnetic head 21 having the configuration in which the integration surface 2202 and the medium-facing surface S are perpendicular to each other. As a result, it is feasible to implement the thermally assisted magnetic recording with high heating efficiency of the recording layer of the magnetic disk.

Since in the present embodiment the magnetic head portion 32 is fixed to the slider substrate 220 and the laser diode 40 as the light source is separately fixed to the light source support substrate 230, the thermally assisted magnetic head 21 as a nondefective product can be produced with a good yield by individually testing each of the electromagnetic coil element 34 fixed to the slider substrate 220 and the laser diode 40 fixed to the light source support substrate 230, and thereafter fixing the slider 22 as a nondefective unit and the light source unit 23 as a nondefective unit to each other.

Since the magnetic head portion 32 is disposed on the side surface of the slider substrate 220, the electromagnetic coil element 34, the MR effect element 33, and others of the magnetic head portion 32 can be readily formed by the production methods of the conventional thin film magnetic heads.

Furthermore, since the laser diode 40 is located at the position apart from the medium-facing surface S and near the slider 22, it is feasible to suppress the adverse effect of the heat generated from the laser diode 40, on the electromagnetic coil element 34, the MR effect element 33, etc., and the possibilities of contact or the like between the laser diode 40 and the magnetic disk 10, to reduce the propagation loss of light because of the dispensability of an optical fiber, a lens, a mirror, etc., and to simplify the structure of the entire magnetic recording apparatus.

Since in the present embodiment the heat insulation layer 230a is formed on the back surface of the light source support substrate 230, the heat generated from the laser diode 40 is less likely to be transferred to the slider 22.

In the above embodiment the slider substrate 220 and the light source support substrate 230 were the substrates of the same material of AlTiC, but it is also possible to use substrates of different materials. In this case, where the thermal conductivity of the slider substrate 220 is $\lambda s$ and the thermal conductivity of the light source support substrate 230 is $\lambda l$, they are preferably selected to satisfy $\lambda s < \lambda l$. This facilitates the transfer of the heat generated by the laser diode 40, through the light source support substrate 230 to the outside while minimizing the transfer of the heat to the slider substrate 220.

The sizes of the slider 22 and the light source unit 23 are arbitrary, but the slider 22 may be, for example, a so-called femtoslider having the width of 700 μm in the track width direction×length (depth) of 850 μm×thickness of 230 μm. In this case, the light source unit 23 can have the width and length approximately equal to them. In fact, the typical size of the ordinary laser diode is approximately the width of 250 μm×length (depth) of 350 μm×thickness of 65 μm, and the laser diode 40 of this size can be adequately mounted, for example, on the side surface of the light source support substrate 230 of this size It is also possible to make a groove in the bottom surface of the light source support substrate 230 and locate the laser diode 40 in this groove.

The spot of the far field pattern of the laser light reaching the entrance face 354 of the first waveguide 35 can be made in the size in the track width direction, for example, of about 0.5-1.0 μm and the size perpendicular to the foregoing size, for example, of about 1-5 μm. In correspondence thereto, the thickness T35 of the first waveguide 35 receiving this laser light is preferably, for example, about 2-10 μm so as to be larger than the spot and the width (W35) in the track width direction of the first waveguide 35 is preferably, for example, about 1-200 μm.

In the above-described embodiment the width W39 in the track width direction and the thickness T39 of the second waveguide 39 in FIG. 6 are the same as those of the first waveguide 35, but they may be different from each other. Furthermore, in the above embodiment, as shown in FIG. 5, the first waveguide 35 and the second waveguide 39 are separated from each other in the track width direction, but the second waveguide 39 may be set anywhere relative to the first waveguide 35 in the magnetic head portion 32. The point is that the positional relation of the first waveguide 35 with the second waveguide 39 can be accurately determined on a plane parallel to the medium-facing surface S.

In the above embodiment the first waveguide 35 and the second waveguide 39 are formed so that their axes are parallel to each other, but the axes do not always have to be parallel to each other.

The electromagnetic coil element 34 may be one for longitudinal magnetic recording. In this case, a lower magnetic pole layer and an upper magnetic pole layer are provided instead of the main magnetic pole layer 340 and the auxiliary magnetic pole layer 344, and a writing gap layer is interposed between the ends on the medium-facing surface S side of the lower magnetic pole layer and the upper magnetic pole layer. Writing is implemented by a leakage magnetic field from the position of this writing gap layer.

The shape of the near-field light generator is not limited to the one described above, either, and it can also be, for example, a trapezoid shape resulting from truncation of the vertex 36v, instead of the triangular shape. It is also possible to adopt a so-called "bow tie type" structure in which a pair of sheets of a triangular shape or a trapezoidal shape are opposed to each other with their vertices or shorter sides being spaced by a predetermined distance. In this "bow tie type" structure, a very strong electric field is concentrated in the central region thereof The near-field light generator 36 may be a small aperture smaller than the wavelength of light, disposed on the medium-facing surface S side of the first waveguide 35.

The coil layer 342 is one layer in FIG. 4 and others, but it may be two or more layers, or a helical coil.

The heat insulation layer 230a may be formed on the back surface 2201 of the slider substrate 220, and the present invention can also be carried out without the heat insulation layer.

The bonding between the light source unit 23 and the slider 22 can also be implemented with any adhesive other than the UV cure type adhesive, e.g., with a solder layer of AuSn or the like which was used in the bonding between the laser diode 40 and the electrode pad 47.

It should be noted that the above-described embodiments all were described as illustrative of the present invention but not restrictive of the invention, and that the present invention can also be carried out in a variety of other modification and change forms. Therefore, the scope of the present invention should be defined by the scope of claims and scope of equivalents thereof only.

What is claimed is:

1. A thermally assisted magnetic head comprising:
a slider having a medium-facing surface; and
a light source unit having a light source support substrate and a light source disposed on the light source support substrate;
wherein the slider has a slider substrate and a magnetic head portion disposed on a side of the medium-facing surface in the slider substrate;
wherein the magnetic head portion includes a magnetic recording element for generating a magnetic field, first and second waveguides for receiving light through an end face thereof opposite to the medium-facing surface, and guiding the light to the medium-facing surface, the first waveguide having a first entrance face and a first exit face and the second waveguide having a second entrance face and a second exit face and a near-field light generator disposed on the first exit face of the first waveguide;
wherein the light source support substrate is fixed to a surface opposite to the medium-facing surface in the slider substrate so that light emitted from the light source can enter the end face of the first waveguide,
wherein the first entrance face is provided on an end face opposite to the medium-facing surface and the first exit face is provided on the medium-facing surface;
wherein the second entrance face is provided on the end face opposite to the medium-facing surface and the second exit face is provided on the medium-facing surface; and
wherein the first waveguide is separate from the second waveguide.

2. The thermally assisted magnetic head according to claim 1, wherein the light source is disposed on a side surface of the light source support substrate.

3. The thermally assisted magnetic head according to claim 1, wherein the first waveguide has a width in a track width direction larger than a thickness in a direction perpendicular to the track width direction, and wherein the first waveguide and the second waveguide are separated from each other in the track width direction.

4. The thermally assisted magnetic head according to claim 1, wherein the first waveguide and the second waveguide have their respective thicknesses equal to each other in the direction perpendicular to the track width direction.

5. A head gimbal assembly comprising the thermally assisted magnetic head as defined in claim 1, and a suspension supporting the thermally assisted magnetic head.

6. A hard disk drive comprising the head gimbal assembly as defined in claim 5, and a magnetic recording medium.

7. The thermally assisted magnetic head according to claim 1, wherein the near-field light generator is made of metal.

8. A method of producing a thermally assisted magnetic head, the method comprising:

preparing a slider comprising: a slider substrate and a magnetic head portion disposed on a side of a medium-facing surface in the slider substrate, said magnetic head portion having a magnetic recording element for generating a magnetic field, first and second waveguides for receiving light through an end face thereof opposite to the medium-facing surface, and guiding the light to the medium-facing surface, the first waveguide having a first entrance face and a first exit face and the second waveguide having a second entrance face and a second exit face and a near-field light generator disposed on the first exit face of the first waveguide; and a light source unit comprising a light source support substrate and a light source disposed on the light source support substrate;

a first alignment step of letting the light source emit light in a state in which the light source unit is located on a surface opposite to the medium-facing surface of the slider, and moving relative positions of the slider and the light source unit so as to maximize an intensity of light detected by a photodetector located opposite to an end face on the medium-facing surface side of the second waveguide;

a second alignment step of moving the relative positions of the slider and the light source unit in a direction and by a distance preliminarily determined based on a positional relation between the second waveguide and the first waveguide, after the first alignment step; and a fixing step of fixing the light source support substrate to a surface opposite to the medium-facing surface in the slider substrate after the second alignment step, wherein the first entrance face is provided on an end face opposite to the medium-facing surface and the first exit face is provided on the medium-facing surface;

wherein the second entrance face is provided on the end face opposite to the medium-facing surface and the second exit face is provided on the medium-facing surface; and wherein the first waveguide is separate from the second waveguide.

9. The method according to claim 8, wherein the first waveguide has a width in a track width direction larger than a thickness in a direction perpendicular to the track width direction, and the first waveguide and the second waveguide are separated from each other in the track width direction, and wherein in the second alignment step the relative positions of the slider and the light source unit are moved only in the track width direction.

* * * * *